UNITED STATES PATENT OFFICE.

MAX AMS, OF MOUNT VERNON, NEW YORK.

MOLD COMPOUND.

No. 814,007.

Specification of Letters Patent.

Patented March 6, 1906.

Application filed November 28, 1905. Serial No. 289,420.

*To all whom it may concern:*

Be it known that I, MAX AMS, a citizen of the United States, residing at Mount Vernon, Westchester county, State of New York, have invented new and useful Improvements in Mold Compounds, of which the following is a specification.

This invention relates to a mold for casting metal.

The mold consists of a mixture of the following ingredients in about the proportions specified: one part powdered mineral wool, one and one-half parts plaster-of-paris, one-half part agar-agar, one part water.

The mold is made by masking a model with the above composition, permitting the latter to set, and then cutting it into sections, so that it may be drawn off the model. The agar-agar is a Japanese vegetable jelly and renders the mold plastic, so that it may be drawn off undercut portions of the model.

The mineral wool serves to increase the flexibility of the mold, while adding to its strength. At the same time it imparts a surface of superior smoothness to the mold, which is of great importance for obtaining a perfect cast.

What I claim is—

A mold compound composed of powdered mineral wool, plaster-of-paris, and agar-agar, substantially as specified.

Signed by me at New York city, Manhattan, New York, this 27th day of November, 1905.

MAX AMS.

Witnesses:
 WILLIAM SCHULZ,
 FRANK V. BRIESEN.